(12) United States Patent
Kellermeier et al.

(10) Patent No.: US 12,703,253 B2
(45) Date of Patent: Aug. 11, 2026

(54) COIL UNIT FOR INDUCTIVELY CHARGING A VEHICLE, AND SYSTEM

(71) Applicant: Bayerische Motoren Werke Aktiengesellschaft, Munich (DE)

(72) Inventors: Josef Kellermeier, Geiselhoering (DE); Josef Krammer, Holzkirchen (DE); Hartmut Koenig, Hebertshausen (DE); Stefan Opl, Bad Kohlgrub (DE); Martin Peteratzinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 329 days.

(21) Appl. No.: 16/355,064

(22) Filed: Mar. 15, 2019

(65) Prior Publication Data

US 2019/0214190 A1 Jul. 11, 2019

Related U.S. Application Data

(63) Continuation of application No. PCT/EP2017/072438, filed on Sep. 7, 2017.

(30) Foreign Application Priority Data

Sep. 16, 2016 (DE) ..................... 10 2016 217 795.8

(51) Int. Cl.
*B60L 53/12* (2019.01)
*B60L 53/122* (2019.01)
(Continued)

(52) U.S. Cl.
CPC ............ *B60L 53/12* (2019.02); *B60L 53/122* (2019.02); *B60L 53/302* (2019.02); *B60L 53/65* (2019.02);
(Continued)

(58) Field of Classification Search
CPC ........ B60L 53/12; B60L 53/302; B60L 53/30; B60L 53/65; H01F 27/04; H01F 27/288;
(Continued)

(56) References Cited

U.S. PATENT DOCUMENTS 5,703,462 A * 12/1997 Woody .................... H01F 38/14 320/108
7,551,053 B2 * 6/2009 Yamashita ............ H01F 17/045 343/870
(Continued)

FOREIGN PATENT DOCUMENTS

CN 103492220 A 1/2014
CN 105164771 A 12/2015
(Continued)

OTHER PUBLICATIONS

International Search Report (PCT/ISA/210) issued in PCT Application No. PCT/EP2017/072438 dated Dec. 1, 2017 with English translation (10 pages).
(Continued)

*Primary Examiner* — Taelor Kim
*Assistant Examiner* — Johali A Torres Ruiz
(74) *Attorney, Agent, or Firm* — Crowell & Moring LLP

(57) ABSTRACT

A coil unit inductively charges a vehicle. The coil unit has a housing and a coil. The coil is arranged at least partly in the housing. The coil has a plurality of windings of at least one electrical line, wherein the electrical line has two ends, and both ends of the electrical line are led out of the housing for connection to an electronic unit.

16 Claims, 5 Drawing Sheets

(51) Int. Cl.

| | |
|---|---|
| ***B60L 53/302*** | (2019.01) |
| ***B60L 53/65*** | (2019.01) |
| ***H01F 27/04*** | (2006.01) |
| ***H01F 27/28*** | (2006.01) |
| ***H01F 27/36*** | (2006.01) |
| ***H01F 38/14*** | (2006.01) |

(52) U.S. Cl.

CPC .......... *H01F 27/04* (2013.01); *H01F 27/288* (2013.01); *H01F 27/363* (2020.08); *H01F 38/14* (2013.01); *Y02T 10/70* (2013.01); *Y02T 10/7072* (2013.01); *Y02T 90/12* (2013.01); *Y02T 90/14* (2013.01)

(58) Field of Classification Search

CPC ...... H01F 27/36; H01F 38/14; Y02T 10/7005; Y02T 10/7072; Y02T 10/7094; Y02T 10/122; Y02T 10/14

See application file for complete search history.

(56) References Cited

U.S. PATENT DOCUMENTS

| | | | | | |
|---|---|---|---|---|---|
| 2005/0094328 | A1* | 5/2005 | Weiss | H01R 24/28 | 361/2 |
| 2011/0246014 | A1* | 10/2011 | Sauper | H01R 13/665 | 439/620.21 |
| 2012/0025942 | A1* | 2/2012 | Bhat | H01F 38/14 | 307/104 |
| 2012/0154776 | A1* | 6/2012 | Damen | G03F 7/70991 | 355/71 |
| 2012/0190225 | A1* | 7/2012 | Bessyo | H01R 13/64 | 439/177 |
| 2013/0102163 | A1* | 4/2013 | Basavarajappa | B60L 53/68 | 310/67 R |
| 2013/0181797 | A1 | 7/2013 | Hickox | | |
| 2014/0029233 | A1* | 1/2014 | Yanagida | H01Q 7/00 | 361/818 |
| 2014/0175892 | A1* | 6/2014 | Jonas | H01F 27/006 | 307/104 |
| 2014/0213089 | A1* | 7/2014 | Ueberschlag | H01R 13/648 | 439/271 |
| 2014/0292091 | A1 | 10/2014 | Wechlin et al. | | |
| 2014/0327391 | A1 | 11/2014 | Niederhauser et al. | | |
| 2015/0118898 | A1* | 4/2015 | Paynter | H01R 13/6597 | 333/260 |
| 2015/0200477 | A1* | 7/2015 | Kim | H05K 1/144 | 439/378 |
| 2016/0016476 | A1* | 1/2016 | Lovshin | H02K 53/00 | 290/45 |
| 2016/0020019 | A1* | 1/2016 | Kagami | H02J 50/70 | 307/104 |
| 2016/0114687 | A1* | 4/2016 | Ichikawa | B60L 53/38 | 307/104 |
| 2016/0204618 | A1* | 7/2016 | Samuelsson | H02J 50/12 | 307/104 |
| 2016/0264007 | A1* | 9/2016 | Haase | B60L 53/126 | |
| 2016/0380487 | A1* | 12/2016 | Widmer | H02J 50/12 | 324/654 |
| 2017/0126059 | A1* | 5/2017 | Takahashi | H02J 50/90 | |
| 2017/0237295 | A1* | 8/2017 | Yuasa | H02J 5/005 | 307/104 |
| 2017/0326994 | A1* | 11/2017 | Yuasa | H02J 7/0042 | |
| 2019/0326049 | A1* | 10/2019 | Nishimura | H01F 5/02 | |

FOREIGN PATENT DOCUMENTS

| | | | | |
|---|---|---|---|---|
| DE | 697 00 730 | T2 | | 3/2000 |
| DE | 10 2010 054 848 | A1 | | 6/2012 |
| EP | 0 820 073 | A1 | | 1/1998 |
| EP | 2 701 282 | A1 | | 2/2014 |
| JP | 2014-82339 | A | | 5/2014 |
| JP | 2016085823 | A | * | 5/2016 |
| WO | WO 2012/144658 | A2 | | 10/2012 |
| WO | WO 2016/028704 | A1 | | 2/2016 |

OTHER PUBLICATIONS

German-language Written Opinion (PCT/ISA/237) issued in PCT Application No. PCT/EP2017/072438 dated Dec. 1, 2017 (10 pages).

German-language Search Report issued in counterpart German Application No. 102016217795.8 dated Aug. 1, 2017 with partial English translation (18 pages).

Chinese-language Office Action issued in Chinese Application No. 201780056791.1 dated May 21, 2020 with English translation (18 pages).

* cited by examiner

COIL UNIT FOR INDUCTIVELY CHARGING A VEHICLE, AND SYSTEM

CROSS REFERENCE TO RELATED APPLICATIONS

This application is a continuation of PCT International Application No. PCT/EP2017/072438, filed Sep. 7, 2017, which claims priority under 35 U.S.C. § 119 from German Patent Application No. 10 2016 217 795.8, filed Sep. 16, 2016, the entire disclosures of which are herein expressly incorporated by reference.

BACKGROUND AND SUMMARY OF THE INVENTION

The invention relates to a coil unit for inductively charging a vehicle. The invention furthermore relates to a system.

Many modern vehicles are hybrid or electric vehicles. Such vehicles frequently have electric energy stores with a high charge capacity. To simplify the charging process of the electric energy stores, it is advantageous if the electric energy stores can be charged wirelessly.

There is therefore needed a coil unit that is compact and robust for inductively charging a vehicle.

The invention is characterized by a coil unit for inductively charging a vehicle. The coil unit includes a housing. The coil unit furthermore has a coil that is arranged at least partially in the housing. The coil has a plurality of windings of at least one electrical line, wherein the electrical line has two ends. Both ends of the electrical line are led out of the housing for connecting to an electronic unit.

The connection to the electronic unit here comprises a direct connection to the electronic unit or a connection to the electronic unit via a further connecting piece.

The coil can be a so-called primary coil that is arranged outside the vehicle. In particular, the coil is a so-called secondary coil that is arranged in or at the vehicle.

The coil unit can, for example, be integrated into the vehicle underbody. Severe restrictions on installation space, however, result here. On the one hand, the coil unit, if it is to be integrated into the vehicle underbody, must withstand high stresses, in particular impacts, that can arise, for example, on contact of the underbody with stones. The installation space in the underbody is, furthermore, very limited.

Since the coil unit does not includes the electronic unit, all the delicate electronic parts can be installed at another location in the vehicle, as a result of which the installation space can be used more efficiently and the coil unit is more robust.

During a charging process, however, very high frequencies and voltages are present on the electrical line. The frequency is, for example, 85 kHz and the voltages lie, for example, in a range of up to 1000 V-2000 V. In that both ends of the electrical line are led out of the housing for connecting to the electronic unit, the high frequencies and voltages do not have to be led to the electronic unit over conventional cable connections. The safety and efficiency during a charging process can hereby be increased, and a more compact and robust structure ensured at the same time.

According to an optional embodiment, the electrical line comprises an HF braid.

An HF braid, also known as a high-frequency braid, is a braid that has a larger number of wires insulated from one another. The wires are, in particular, woven together in such a way that as far as possible each individual wire adopts on average every position within the overall cross-section of the braid equally often. As a result, the braid has a very large amount of conductive surface, so that a high efficiency can be achieved in spite of the skin effect.

An HF braid in particular also includes a continuous line insulation. Additional sealings against moisture and leakage currents can hereby be omitted. A continuous line insulation can also be used with an electrical line without an HF braid.

According to a further optional embodiment, a braided shield is arranged around the part of the electrical line that is led out of the housing.

Through the braided shield it is made possible that remaining vehicle electronics are not interfered with by an electromagnetic field that is generated by the electrical line.

According to a further optional embodiment, the housing has an outer side of metal, and the braided shield is connected to the outer side.

A very good line screening can hereby be achieved in a particularly simple manner.

According to a further optional embodiment, the coil unit includes a ferrite component that is arranged at least partially in the housing, and the braided shield is connected to the ferrite component.

In this context, connected means that a gap between the ferrite component and the braided shield is very small (e.g. ≤1 mm).

A very good line screening can hereby be achieved in a particularly simple manner even in the case of housings without metal.

According to a further optional embodiment, the braided shield is connected to the outer side or to the ferrite component by way of a flange.

The braided shield can hereby be fastened to the coil unit very easily. The electrical line is simply led through the flange, and the flange is then fastened to the outer side or to the ferrite component.

According to a further optional embodiment, one or a plurality of signal lines are arranged inside the braided shield.

Additional sensors in the coil unit, for example, can hereby be controlled and/or read out.

According to a further optional embodiment, the coil unit includes a ferrite component which is arranged at least partially in the housing, wherein the ferrite component has a recess. One of the ends of the electrical line is led through the recess of the ferrite component out of the housing.

The one end of the electrical line can be led through the recess out of the housing in a particularly space-saving manner.

According to a further optional embodiment, the ends of the electrical line are led out of the housing at an angle between 45° and 135°.

The coil unit must be removed if, for example during servicing, a person must approach the motor region of the vehicle from underneath. Since this can be laborious, it is advantageous if the coil unit can be turned away about an axis. If the ends of the electrical line are led out of the housing at an angle between 45° and 135°, the coil unit can very easily be turned about an axis without damaging the electrical line.

According to a further optional embodiment, the ends of the electrical line are led essentially straight out of the housing. A very simple structure is hereby possible. "Essentially" here means, for example, ±5°.

According to a further optional embodiment, the coil unit includes a plug for connecting to a socket of the electronic unit, wherein the two ends of the electrical line are connected to the plug. The coil unit can be connected to the electronic unit very easily with the aid of the plug. Alternatively, the two ends of the electrical line can also be connected to a further line, and the further line is connected to the plug.

According to a further optional embodiment, the coil unit has a strain relief that is connected to the plug and the coil unit.

The reliability and safety of the coil can hereby be increased. The strain relief can also be realized through the braided shield.

According to a further optional embodiment, the plug includes devices for electrical disconnection in the event of a separation of the plug-in connection.

Such devices are, for example, a hardware circuit provided for this purpose, first-mate contacts, an HV interlock or the like.

An HV interlock is, for example, designed to monitor the correct connection of plug-in connections with the aim of preventing an electrical hazard arising from an unintentional, improper or otherwise-caused separation of the plug-in connection at an active HV installation. The HV interlock has, for example, a safety line in order to achieve this aim. This involves a series circuit. If the electrical circuit of the safety line is interrupted by pulling out the plug, this is recognized by an HV interlock control unit. The HV interlock control unit is designed to open a relay immediately in order to remove voltage from the electrical line.

According to a further optional embodiment, the plug is designed such that when in the plug-in state it has air and leakage gaps of ≥15 mm, in particular 20 mm. Since very high voltages are present in the plug-in state, it is advantageous to ensure that no hazard arises for a person who touches the plug even during a charging process. The plug has, for example, at least one recess for this purpose, which is arranged radially outside a plug-in contact of the electrical line. The socket has a complementary piece that matches the recess. As a result, the air must first travel approximately around the inner circumference of the recess before it can emerge from the plug, since the complementary piece of the socket blocks the direct path out of the plug and socket.

According to a further aspect, the invention is characterized by a system for inductively charging a vehicle. The system includes the coil unit or an optional embodiment of the coil unit. The system furthermore includes the electronic unit.

According to an optional embodiment, the electronic unit has a resonance capacitor.

The resonance capacitor is a component that forms a resonant circuit with the coil. If this resonance capacitor is arranged in the electronic unit, this means that only the coil itself has to be arranged in the coil unit. All the other electrical components can thus be arranged in the electronic unit, whereby a very compact and robust coil unit is created.

Other objects, advantages and novel features of the present invention will become apparent from the following detailed description of one or more preferred embodiments when considered in conjunction with the accompanying drawings.

DETAILED DESCRIPTION OF THE DRAWINGS

Elements of the same construction or function are identified with the same reference signs across the figures.

Figure 1:
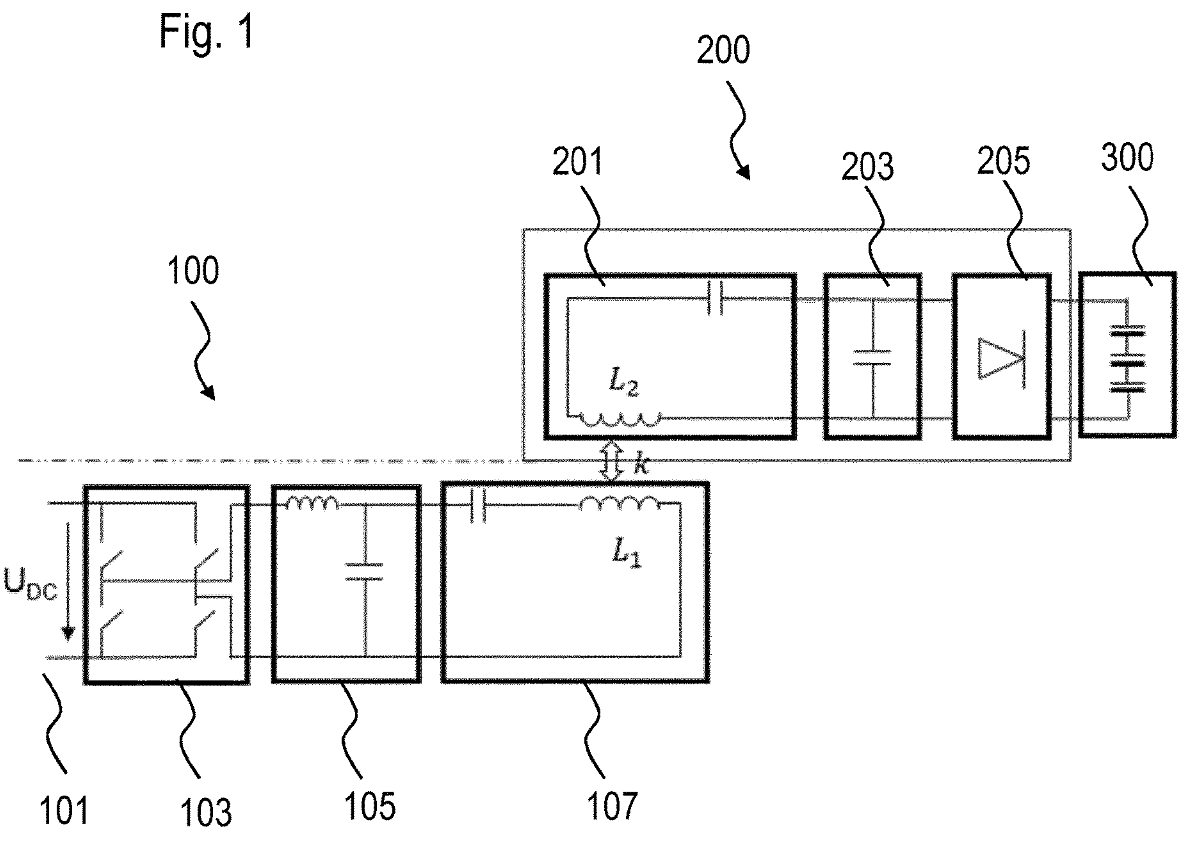
FIG. 1 shows a structure of an inductive charging system.

FIG. 1 shows a structure of an inductive charging system. The charging system consists of a base unit 100 and a vehicle unit 200 that is connected to a vehicle battery 300.

The base unit 100 has a voltage source 101, an inverter 103, a compensation unit 105, and a resonant circuit 107.

The voltage source 101 is designed to make a voltage $U_{DC}$ available.

The compensation unit 105 comprises, for example, a filter. The resonant circuit 107 includes a resonance capacitor and a primary coil L1.

The vehicle unit 200 has a resonant circuit 201, a compensation unit 203 and a rectifier 205 that is connected to the vehicle battery 300 for charging the vehicle battery 300.

The compensation unit 203 of the vehicle unit 200 comprises, for example, a filter. The resonant circuit 201 of the vehicle unit 200 also includes a resonance capacitor and a secondary coil L2.

During a charging process, the secondary coil L2 and the primary coil L1 have an inductive coupling k.

The compensation unit 203 of the vehicle unit 200, the resonance capacitor of the vehicle unit 200, and the rectifier 205 can also be referred to as secondary electronics.

Figure 2:
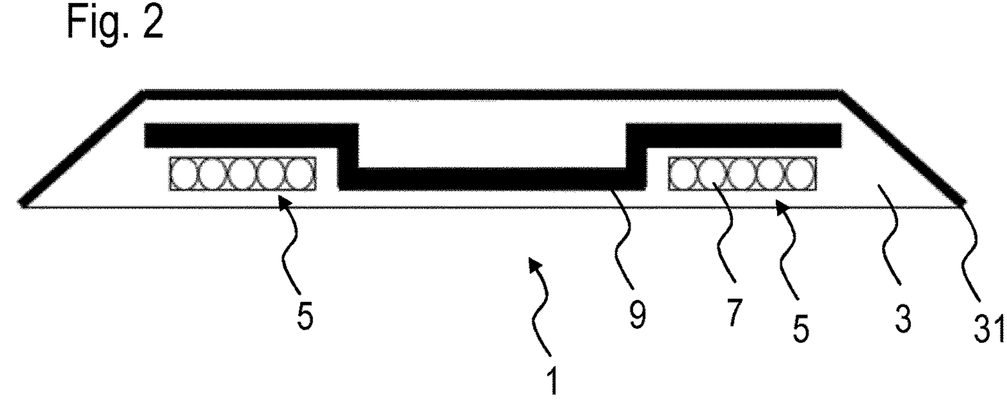
FIG. 2 shows a coil unit.

FIG. 2 shows a coil unit 1 for inductively charging a vehicle. The coil unit 1 has a housing 3. The coil unit 1 furthermore has a coil 5 that is arranged at least partially in the housing 3. The coil 5 is, in particular, the secondary coil L2.

The coil 5 comprises a plurality of windings of at least one electrical line 7. The electrical line 7 comprises, for example, an HF braid; in particular the electrical line 7 is an HF braid.

The coil unit 1 furthermore has a ferrite component 9. The ferrite component 9 can also be referred to as the ferrite core of the coil 5. The ferrite component 9 is arranged at least partially in the housing 3.

The housing 3 is formed in particular on the inside of plastic and has an outer side 31 of metal, in particular for screening upward, i.e. in the direction toward the vehicle. The outer side of the housing 3 is not of metal in the direction toward the ground.

Figure 3:
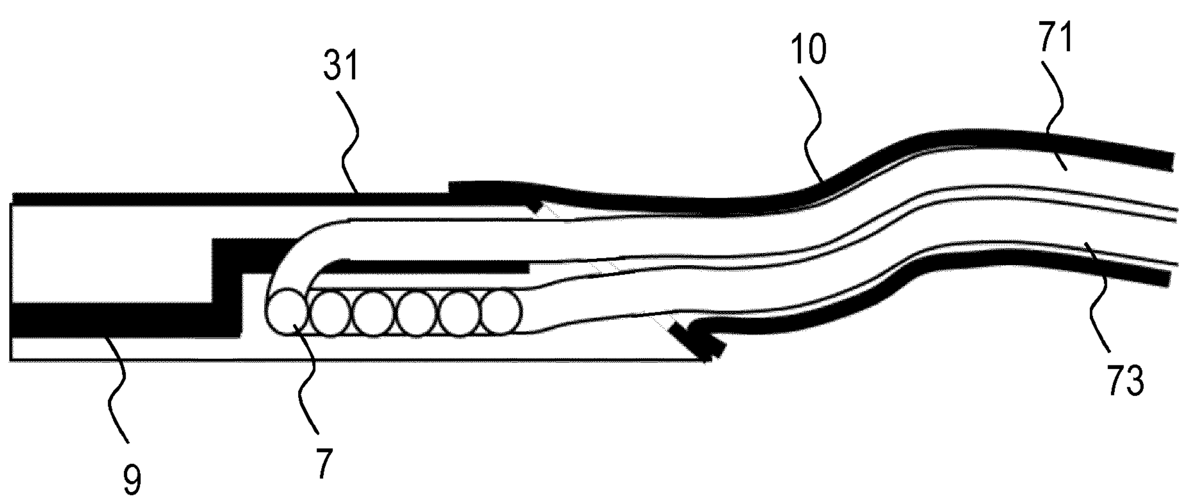
FIG. 3 shows the coil unit with the electrical line led out.

FIG. 3 shows the coil unit 1 with the electrical line 7 led out. The electrical line 7 has two ends 71, 73. Both ends 71, 73 of the electrical line 7 are led out of the housing 3 for connecting to an electronic unit 80 (which is explained later in more detail). The electrical line 7 is, in other words, led out of the housing 3 as one piece. This means that there is no plug-in contact or other interruption of the electrical line 7.

In FIG. 3, a braided shield 10 is arranged around the part of the electrical line 7 that is led out of the housing 3 to screen the electrical line 7 electromagnetically.

The braided shield 10 is fastened in FIG. 3 to the outer side 31 of the housing 3. This is possible when the housing 3 has an outer side 31 of metal. The braided shield 10 can also, alternatively, be fastened to the ferrite component 9.

The electrical line 7 can be led out of the housing 3 in a variety of ways.

Figure 4:
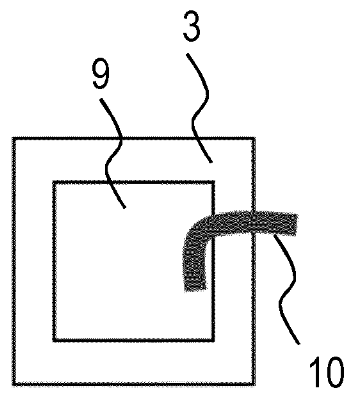
FIG. 4 shows the coil unit, wherein the ends of the electrical line are led out of the housing at an angle.

The ends 71, 73 of the electrical line 7 are, for example, led out of the housing 3 at an angle between 45° and 135°. The ends 71, 73 of the electrical line 7 are in particular led out of the housing 3 at an angle of essentially 90°, as shown in FIG. 4. "Essentially" here means, for example, ±5°.

The legs of the angle are here in particular a first axis that extends along the respective coil winding in the region in which the electrical line 7 is led out, and a second axis that extends essentially in the direction in which the ends 71, 73 of the electrical line 7, that have been led out, essentially extend, after a first bend in relevant cases.

Figure 5:
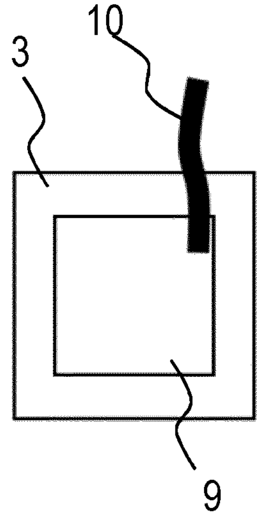
FIG. 5 shows the coil unit, wherein the ends of the electrical line are led essentially straight out of the housing.

The ends 71, 73 of the electrical line 7 are alternatively led essentially straight out of the housing 3, as shown in FIG. 5. "Essentially" here means, for example, ±5°.

Figure 6:
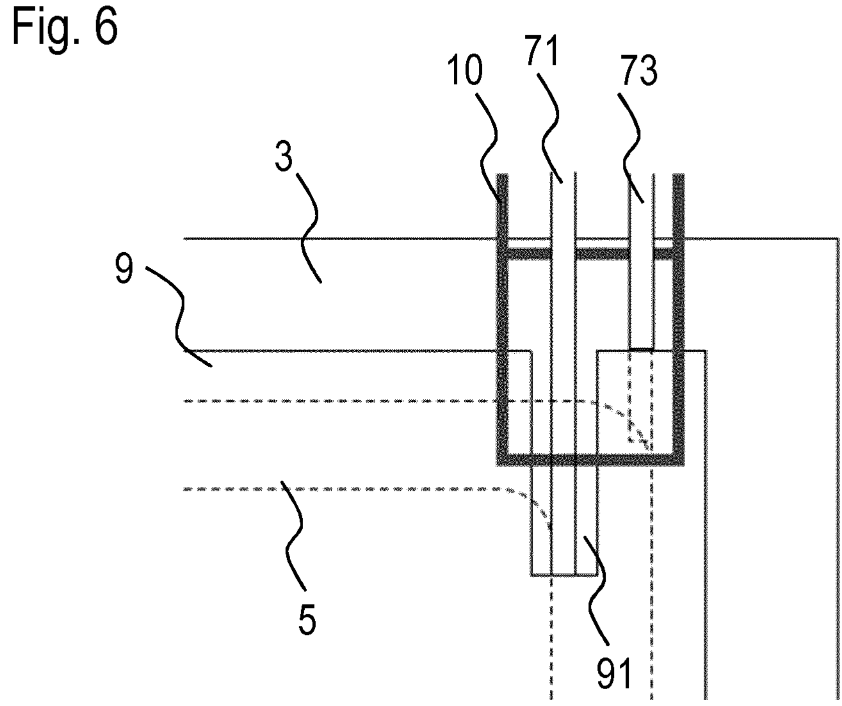
FIG. 6 shows the coil unit with a recess in a ferrite component.

FIG. 6 shows a space-saving possibility for leading in particular an inner end 71 of the electrical line 7 out of the housing 3. The ferrite component 9 has for this purpose a recess 91 and one of the ends 71, 73 of the electrical line 7, that is in particular the inner end 71, is led through the recess 91 of the ferrite component 9 out of the housing 3.

Figure 7:
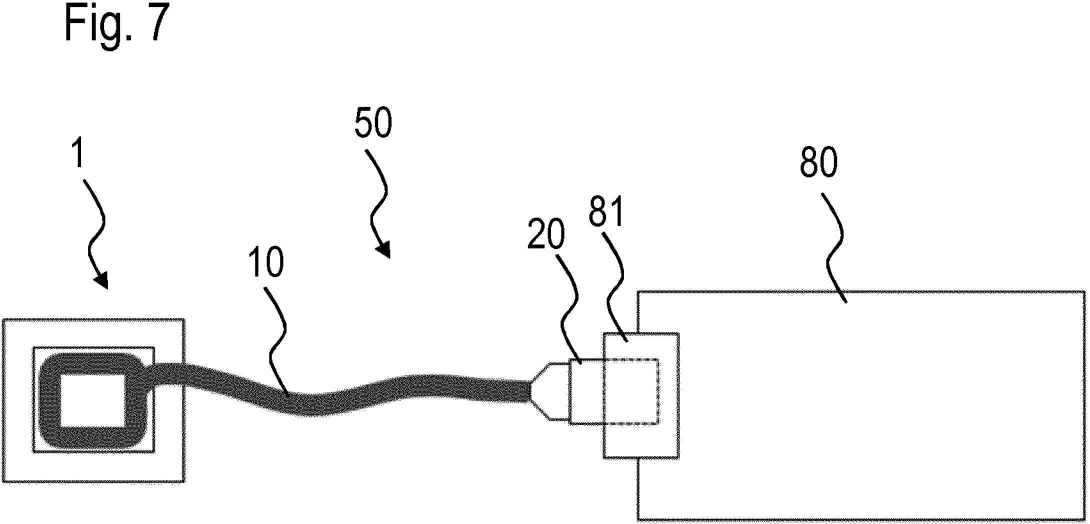
FIG. 7 shows the system with the coil unit and an electronic unit.

FIG. 7 shows a system 50 with the coil unit 1 and the electronic unit 80. The electronic unit 80 comprises in particular the secondary electronics, that is the resonance capacitor of the vehicle unit 200, the compensation unit 203 of the vehicle unit 200 and the rectifier 205. The electronic unit 80 is in addition connected to the vehicle battery 300 to charge the vehicle battery 300.

To connect the coil unit 1 to the electronic unit 80, a socket 81 is provided in particular at the electronic unit 80, and the ends 71, 73 of the electrical line 7 are connected to a plug 20 for connection at the socket 81.

In addition, a strain relief is optionally provided which is connected to the plug 20 and the coil unit 1. The strain relief can also, for example, be realized through the braided shield 10.

Figure 8:
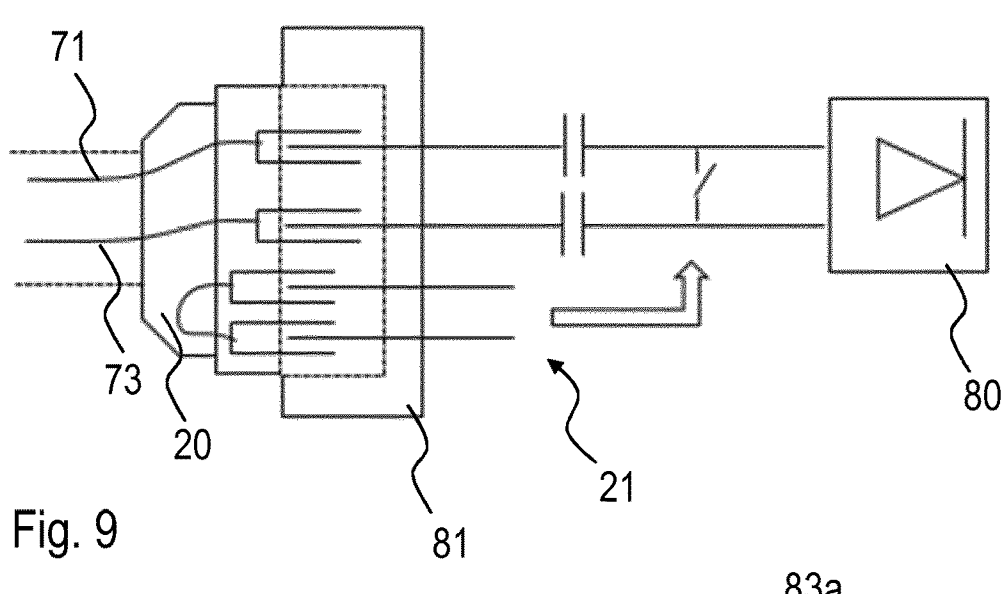
FIG. 8 shows a plug.
Figure 9:
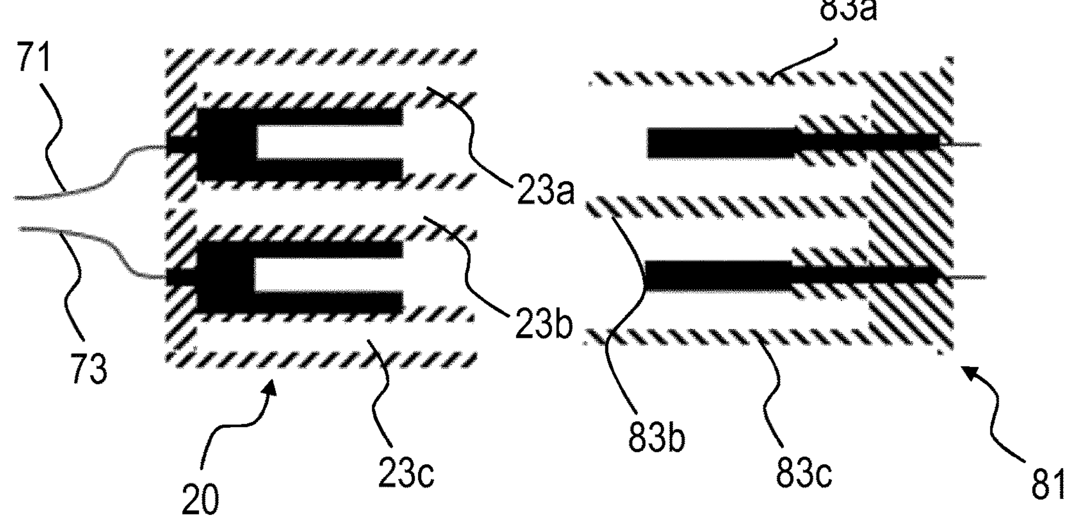
FIG. 9 shows the plug in an open position.
Figure 10:
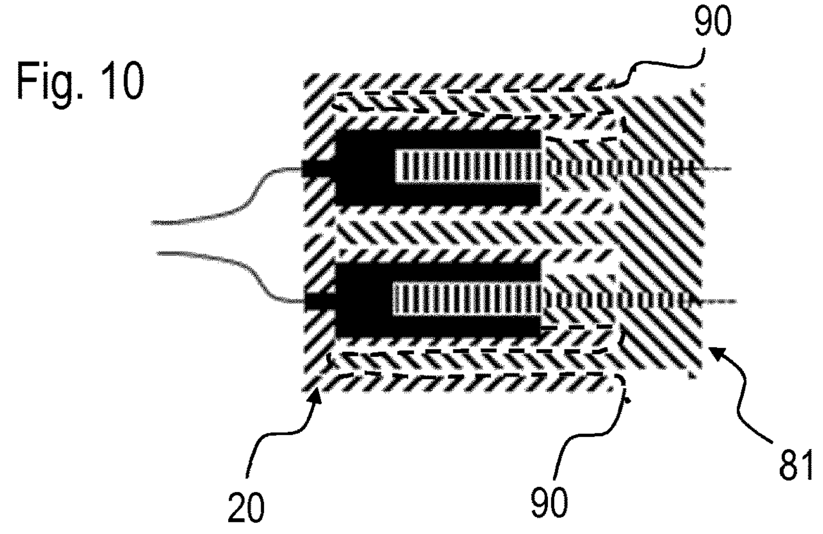
FIG. 10 shows the plug in an inserted position.

FIGS. 8, 9 and 10 show an embodiment of the plug 20.

The plug 20 includes a mechanism 21 for electrical disconnection in the event of a separation of the plug-in connection. Such a mechanism 21 is, for example, a hardware circuit provided for this purpose, first-mate contacts, an HV interlock, or the like.

The plug 20 is, by way of example, designed such that when in the plugged-in state (FIG. 10), it has air and leakage gaps 90 of ≥15 mm, in particular 20 mm. The air and leakage gaps 90 can be shorter in the unplugged state (FIG. 9). For the long air and leakage gaps 90 in the plugged-in state, the plug 20 has, for example, at least one recess 23*a*, 23*b*, 23*c* that is arranged radially outside a plug-in contact of the electrical line 7. The socket 81 comprises a complementary piece 83*a*, 83*b*, 83*c* that matches the recesses 23*a*, 23*b*, 23*c*. As a result, air must first travel approximately around the inner circumference of the recesses 23*a*, 23*b*, 23*c* before it can emerge from the plug 20.

Figure 11:
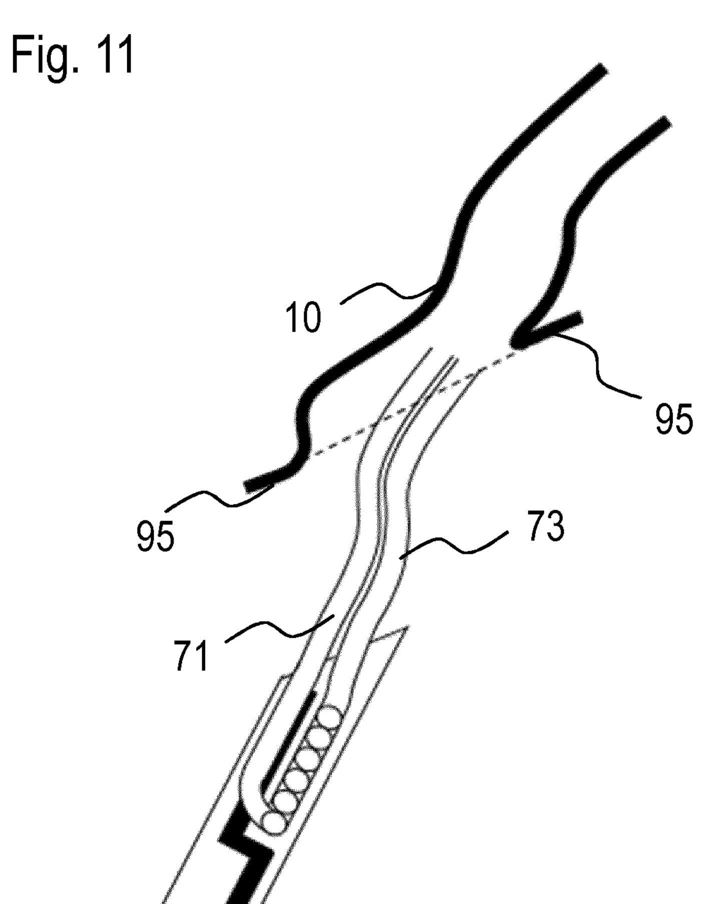
FIG. 11 shows an assembly of coil unit and braided shield.

FIG. 11 shows a possible procedure for assembly of the coil unit 1. The electrical line 7 that is led out of the housing 3 is introduced into the braided shield 10. The braided shield 10 is then fastened to the coil unit 1. The braided shield 10 has, for example, a flange 95 for this purpose, by which the braided shield 10 can be fastened to the coil unit 1, that is in particular to the outer side 31 and/or to the ferrite component 9. The flange 95 is fastened, for example, by use of screws.

Figure 12:
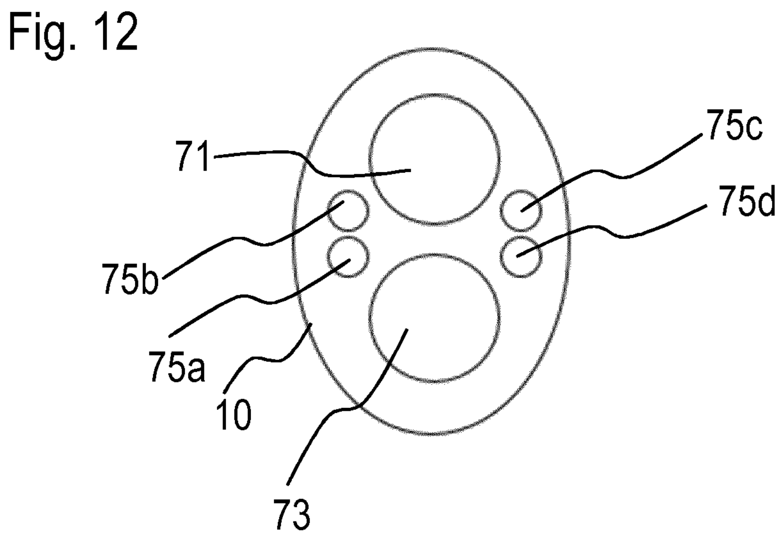
FIG. 12 shows a cross-section of the electrical line with braided shield.

FIG. 12 shows a cross-section of the electrical line 7 with the braided shield 10. One or a plurality of signal lines 75*a*, 75*b*, 75*c*, 75*d* are for example additionally arranged in the braided shield 10, for example two or four signal lines 75*a*, 75*b*, 75*c*, 75*d*.

Since the coil unit 1 and the electronic unit 80 are two separate components, all the delicate electronic parts can be installed at another location in the vehicle, as a result of which the installation space can be used more efficiently and the coil unit is more robust. In that both ends 71, 73 of the electrical line 7 are led out of the housing 3, the high frequencies and voltages do not have to be led to the electronic unit 80 over conventional cable connections. The safety and efficiency during a charging process can thereby be increased, and a more compact and robust structure ensured at the same time.

LIST OF REFERENCE SIGNS

1 Coil unit
3 Housing
5 Coil
7 Electrical cable
9 Ferrite component
10 Braided shield
20 Plug
21 Mechanism
23*a, b, c* Recesses
31 Outer side
50 System
71 End of the electrical line
73 End of the electrical line
75*a, b, c, d* Signal lines
80 Electronic unit
81 Socket
83*a, b, c* Complementary pieces
90 Air and leakage gaps
91 Recess
95 Flange
100 Base unit
101 Voltage source
103 Inverter
105 Compensation unit
107 Resonant circuit
200 Vehicle unit
201 Resonant circuit
203 Compensation unit
205 Rectifier
300 Vehicle battery
UDC Voltage
L1 Primary coil
L2 Secondary coil
k Coupling The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A coil unit for inductively charging a vehicle, comprising:

a housing;

a coil that is arranged at least partially in the housing; and a plug for connecting to a socket of an electronic unit, wherein the coil comprises a plurality of windings of an electrical line, wherein the electrical line has two ends, both ends of the electrical line are connected to the plug, the plug comprises:

an outer non-conductive wall;

a middle non-conductive wall positioned radially inward from the outer non-conductive wall;

an inner non-conductive wall positioned radially inward from the middle non-conductive wall;

an outer recess between the outer and middle non-conductive walls; and a plug-in contact electrically connected to the electrical line, the plug-in contact being positioned between the middle non-conductive wall and the inner non-conductive wall;

an inner recess positioned radially outside of the plug-in contact, a center of the inner recess being coincident with the centerline of the plug;

the outer and inner recesses are configured to engage a plurality of complementary pieces of the socket, and both ends of the electrical line are led out of the housing for connecting to the electronic unit, wherein the electronic unit comprises electronics installed in the vehicle.

2. The coil unit as claimed in claim 1, wherein the electrical line comprises an HF braid.

3. The coil unit as claimed in claim 1, wherein a braided shield is arranged around the electrical line that is led out of the housing.

4. The coil unit as claimed in claim 3, wherein the housing comprises an outer side of metal, and the braided shield is connected to the outer side.

5. The coil unit as claimed in claim 4, wherein the coil unit comprises a ferrite component that is arranged at least partially in the housing, and the braided shield is connected to the ferrite component.

6. The coil unit as claimed in claim 5, wherein the braided shield is connected to the outer side or to the ferrite component by way of a flange.

7. The coil unit as claimed in claim 3, wherein one or a plurality of signal lines are arranged inside the braided shield.

8. The coil unit as claimed in claim 1, further comprising:

a strain relief that is connected to the plug and the coil unit.

9. The coil unit as claimed in claim 1, wherein the plug comprises a mechanism for electrical disconnection in an event of a separation of the plug connection.

10. The coil unit as claimed in claim 1, wherein the ends of the electrical line are led out of the housing at an angle between 45° and 135°.

11. The coil unit as claimed in claim 10, wherein the angle is with respect to:

a first axis that extends along a respective coil winding of the plurality of windings of the coil in a region before the electrical line is led out of the housing, and a second axis that extends essentially along the respective coil winding after a first bend and being led out of the housing.

12. The coil unit as claimed in claim 1, wherein the outer, middle and inner non-conductive walls of the plug extend in a circumferential direction, whereby air travels in a circumferential path before emerging from the plug.

13. The coil unit as claimed in claim 1, wherein the plug has 180-degree rotational symmetry about the centerline of the plug.

14. A coil unit for inductively charging a vehicle, comprising:

a housing;

a coil that is arranged at least partially in the housing; and a plug for connecting to a socket of an electronic unit, wherein the coil comprises a plurality of windings of an electrical line, wherein the electrical line has two ends, both ends of the electrical line are connected to the plug, the plug comprises:

an outer non-conductive wall;

a middle non-conductive wall positioned radially inward from the outer non-conductive wall;

an inner non-conductive wall positioned radially inward from the middle non-conductive wall;

an outer recess between the outer and middle non-conductive walls; and a plug-in contact electrically connected to the electrical line, the plug-in contact being positioned in the middle recess between the middle non-conductive wall and the inner non-conductive wall, an inner recess positioned radially outside of the plug-in contact, a center of the inner recess being coincident with the centerline of the plug;

the outer and inner recesses are configured to engage a plurality of complementary pieces of the socket, both ends of the electrical line are led out of the housing for connecting to the electronic unit, the electronic unit comprising electronics installed in the vehicle, and the plug is configured such that, when in a plugged-in state, it has air and leakage gaps of >=15 mm.

15. The coil unit as claimed in claim 14, wherein the outer, middle and inner non-conductive walls of the plug extend in a circumferential direction, whereby air travels in a circumferential path before emerging from the plug.

16. The coil unit as claimed in claim 14, wherein the plug has 180-degree rotational symmetry about the centerline of the plug.

* * * * *